United States Patent
Hoene et al.

(10) Patent No.: US 12,403,607 B2
(45) Date of Patent: Sep. 2, 2025

(54) METHOD AND SYSTEM FOR MONITORING A ROBOT ARRANGEMENT

(71) Applicants: KUKA AKTIENGESELLSCHAFT, Augsburg (DE); KUKA DEUTSCHLAND GMBH, Augsburg (DE)

(72) Inventors: Albrecht Hoene, Augsburg (DE); Elisabeth Schaertl, Leuchtenberg (DE); Markus Wuensch, Augsburg (DE)

(73) Assignees: KUKA AKTIENGESELLSCHAFT (DE); KUKA Deutschland GmbH (DE)

( * ) Notice: Subject to any disclaimer, the term of this patent is extended or adjusted under 35 U.S.C. 154(b) by 511 days.

(21) Appl. No.: 17/606,284

(22) PCT Filed: Mar. 26, 2020

(86) PCT No.: PCT/EP2020/058451
§ 371 (c)(1),
(2) Date: Oct. 25, 2021

(87) PCT Pub. No.: WO2020/216570
PCT Pub. Date: Oct. 29, 2020

(65) Prior Publication Data
US 2022/0314454 A1    Oct. 6, 2022

(30) Foreign Application Priority Data
Apr. 26, 2019  (DE) ............. 10 2019 206 010.2

(51) Int. Cl.
*B25J 9/16*  (2006.01)
*B25J 13/08* (2006.01)

(52) U.S. Cl.
CPC ............. *B25J 9/1697* (2013.01); *B25J 9/163* (2013.01); *B25J 9/1653* (2013.01); *B25J 13/087* (2013.01)

(58) Field of Classification Search
CPC ........ B25J 9/163; B25J 9/1653; B25J 9/1666; B25J 9/1676; B25J 9/1697; B25J 13/087;
(Continued)

(56) References Cited

U.S. PATENT DOCUMENTS

| 4,766,322 A | 8/1988 | Hashimoto |
| 4,804,860 A | 2/1989 | Ross et al. |

(Continued)

FOREIGN PATENT DOCUMENTS

| DE | 20 2014 100 411 U1 | 5/2015 |
| DE | 10 2015 000 793 A1 | 7/2016 |

(Continued)

OTHER PUBLICATIONS

Chinese Patent Office; Office Action in related Chinese Patent Application 2020800403082 dated Aug. 15, 2023; 7 pages.
(Continued)

*Primary Examiner* — Jason Holloway
*Assistant Examiner* — Blake A Wood
(74) *Attorney, Agent, or Firm* — Dorton & Willis, LLP

(57) ABSTRACT

A method for monitoring a robot arrangement, which robot arrangement has at least one robot includes capturing optical signals from a plurality of signal sources at least one sensor, wherein the signal sources and/or the sensor is/are positioned on the robot arrangement and triggering a monitoring reaction if a deviation of an actual arrangement of the captured optical signals from a desired arrangement of these signals exceeds a limit value. In one aspect, a reaction may be triggered if at least a predefined minimum number of
(Continued)

signals from the desired arrangement is not present in the actual arrangement of the captured optical signals.

13 Claims, 1 Drawing Sheet

(58) Field of Classification Search
CPC ......... B25J 19/021; B25J 19/06; F16P 3/142; F16P 3/144; G05B 19/4061; G05B 2219/37631; G05B 2219/40202
See application file for complete search history.

(56) References Cited

U.S. PATENT DOCUMENTS

| | | | |
|---|---|---|---|
| 9,131,121 B2* | 9/2015 | Matsudo | F16P 3/142 |
| 2009/0285664 A1 | 11/2009 | Kim et al. | |
| 2013/0325181 A1 | 12/2013 | Moore | |
| 2017/0157783 A1 | 6/2017 | Ogawa | |
| 2018/0071914 A1* | 3/2018 | Heidemann | F16P 3/142 |
| 2020/0114518 A1 | 4/2020 | Allmendinger et al. | |
| 2020/0298411 A1* | 9/2020 | Feiten | B25J 9/1664 |
| 2020/0400275 A1* | 12/2020 | Romano | F16P 3/147 |

FOREIGN PATENT DOCUMENTS

| | | |
|---|---|---|
| DE | 10 2015 001 575 A1 | 8/2016 |
| DE | 10 2015 225 587 A1 | 6/2017 |
| DE | 102016114835 A1 | 2/2018 |
| DE | 10 2017 005 194 B3 | 9/2018 |
| DE | 20 2017 104 603 U1 | 11/2018 |
| FR | 3060182 A1 | 6/2018 |
| WO | 2018029267 A1 | 2/2018 |
| WO | 2018109355 A1 | 6/2018 |

OTHER PUBLICATIONS

European Patent Office; Search Report in related International Patent Application No. PCT/EP2020/058451 dated Jul. 13, 2020; 3 pages.
German Patent Office; Search Report in related German Patent Application No. 10 2019 206 010.2 dated Mar. 9, 2020; 7 pages.
European Patent Office; Office Action in related European Patent Application 20 716 721.4 dated Oct. 18, 2024; 5 pages.
Korean Patent Office; Office Action in related Korean Patent Application 10-2021-7037909 dated Mar. 10, 2025; 7 pages.

* cited by examiner

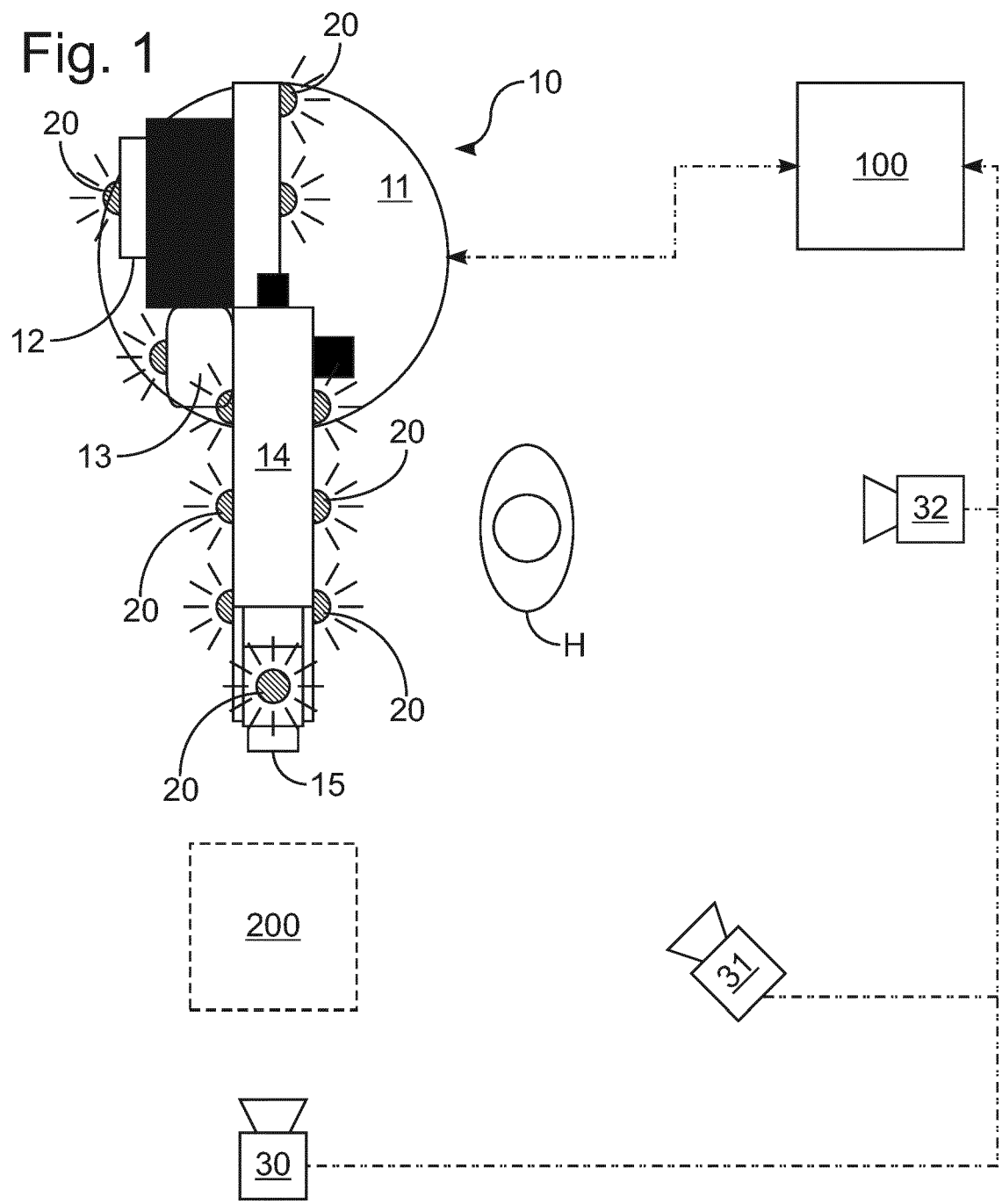
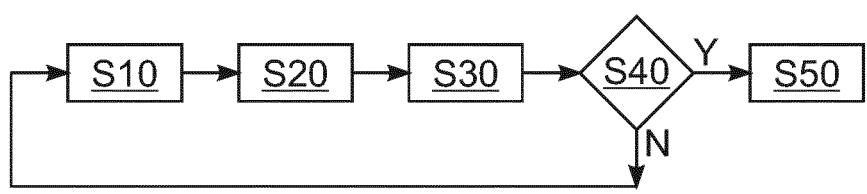

METHOD AND SYSTEM FOR MONITORING A ROBOT ARRANGEMENT

CROSS-REFERENCE TO RELATED APPLICATIONS

This application is a national phase application under 35 U.S.C. § 371 of International Patent Application No. PCT/EP2020/058451, filed Mar. 26, 2020 (pending), which claims the benefit of priority to German Patent Application No. DE 10 2019 206 010.2, filed Apr. 26, 2019, the disclosures of which are incorporated by reference herein in their entirety.

TECHNICAL FIELD

The present invention relates to a method and to a system for monitoring a robot arrangement which has at least one robot, as well as to a computer program product for carrying out the method.

BACKGROUND

From company-internal practice, monitoring of robots for the unexpected presence of people using safe sensors is known.

Due to the required security, these sensors are expensive and their commissioning is complex.

SUMMARY

The object of the present invention is to improve monitoring of a robot arrangement, in particular to provide or use a (more) simple and/or (more) inexpensive system for this purpose.

This object is achieved by a method and a system or computer program product for carrying out a method as described herein.

According to one embodiment of the present invention, a method for monitoring a robot arrangement, in particular for the presence of unexpected obstacles in the working region of the robot arrangement, comprises the following steps:

capturing optical signals from a plurality of signal sources by one or a plurality of sensors, wherein the signal sources and/or the sensor or one or a plurality of the sensors is, in particular will be, positioned on the robot arrangement, in particular the one or a plurality of robot(s) of the robot arrangement; and triggering a monitoring reaction if a deviation between an actual arrangement of the captured optical signals and a (predicted) desired arrangement of these signals exceeds a one- or multi-dimensional limit value, in particular if at least a predefined minimum number of signals from the desired arrangement is not present in the actual arrangement of the captured optical signals, wherein this minimum number is equal to one in one embodiment, greater than one and/or less than 10 in one embodiment, or this is determined.

One embodiment of the present invention is based on the idea of comparing a desired arrangement of the signals, which will be or is predicted or assumed for a state without unexpected obstacles, with a captured actual arrangement. If one or at least the predefined minimum number of the optical signals provided in the desired arrangement or predicted by them is not present, this may be due to the fact that the corresponding signal source(s) fail to emit an optical signal, the corresponding sensor(s) fail to capture the optical signal, or in particular c) an unexpected obstacle interrupts the optical path (on which the desired arrangement is based) between the signal source(s) and the sensor(s).

As a result, in one embodiment, using signal sources and/or sensors which are not inherently safe or which are not designed in safe technology and are therefore (more) cost-effective, it is possible to react (more) reliably to an unexpected obstacle in the vicinity of the robot arrangement, since errors in the signal sources and sensors as well as an unexpected obstacle lead to a deviation of the actual arrangement of the captured optical signals from their desired arrangement and trigger the (same) monitoring reaction.

In one embodiment, the robot arrangement has one or a plurality of robots, in particular one or a plurality of stationary robots and/or one or a plurality of mobile robots, which in one embodiment (each) have a robot arm with at least three, in particular at least six, in one embodiment at least seven joints, in particular swivel joints; the robot arrangement can in particular consist thereof.

Because of its workspaces and processes, the present invention can be used with particular advantage for monitoring such robot arrangements.

In one embodiment, one or a plurality of the signal sources are active (emitting) signal sources that (actively) emit the optical signals, in one embodiment laser light and/or visible (laser) light, infrared (laser) light and/or UV (laser) light.

As a result, in one embodiment, the monitoring can advantageously be carried out reliably, in particular even in poor(er) light conditions.

Additionally or alternatively, one or a plurality of the signal sources are passive (or only reflecting) signal sources which (in each case) can be illuminated and reflect light as an optical signal, in particular in a targeted manner, in one embodiment and/or (only) at predefined times, by one or a plurality of light sources with light, in one embodiment, laser light and/or visible (laser) light, infrared (laser) light and/or UV (laser) light.

As a result, these signal sources can be made smaller in one embodiment and/or an energy supply for signal sources positioned on the robot arrangement can be dispensed with.

In the present case, both (active) emitting and (passive) reflecting are generally referred to as emitting (the optical signals by the (corresponding) signal source(s)) for a more compact representation.

In one embodiment, one or a plurality of the signal sources (each) have one or a plurality of LEDs and/or laser pointers. As a result, particularly advantageous optical signals can be used in one embodiment.

Additionally or alternatively, one or a plurality of (optical) deflection means, in particular mirrors and/or prisms, are or will be arranged in an embodiment in an optical path between one or a plurality of the signal sources and the or one or a plurality of the sensors (in each case according to plan or in a targeted manner), which deflect light between the signal source and sensor or are set up or used for this purpose.

As a result, in one embodiment, these sensors can also be used to view concealed regions, as is known per se, for example, from ceiling mirrors at supermarket checkouts for viewing shopping carts.

The robot arrangement can advantageously be monitored in different positions in one embodiment, in that the signal sources and/or the sensor(s) are positioned on the robot arrangement, in particular its robot(s).

In one embodiment, signal sources are or will be positioned near, in particular on, the robot arrangement, in particular its robot(s).

Then, in one embodiment, the or one or a plurality of the sensors can be or become positioned at a distance from the robot arrangement or on the vicinity side, in particular fixed on the vicinity side, and can thus, so to speak, observe the robot arrangement from the outside.

Additionally or alternatively, in one embodiment, the or one or a plurality of the sensors can in turn (also) be or become positioned on the robot arrangement, in particular its robot(s), so that the robot arrangement can, so to speak, observe itself.

In particular, a sensor which is arranged on a link, for example a base, of a robot can capture optical signals from a signal source on another link, for example an end effector, of this robot and thus obstacles between the two links or base and end effector can be recognized.

Additionally or alternatively, in one embodiment, the or one or a plurality of the sensors are or will be positioned on the robot arrangement, in particular its robot(s).

Then, in one embodiment, as described above, one or a plurality of the signal sources can in turn (also) be or become positioned on the robot arrangement, in particular its robot(s) (link(s)), so that the robot arrangement can, so to speak, observe itself and react to obstacles between its links.

Additionally or alternatively, in one embodiment, one or a plurality of the signal sources can then be or become also firmly positioned at a distance from the robot arrangement or on the vicinity side, in particular fixed on the vicinity side, so that, conversely, the vicinity can, so to speak, be observed from the robot arrangement.

By positioning signal sources on the robot arrangement, their operation is slightly (more) hindered in one embodiment. By positioning sensors on the vicinity side, they are advantageously not dynamically loaded by movements of the robot arrangement. By positioning signal sources on the vicinity side and positioning sensors on the robot arrangement, different or large work spaces can advantageously be inventively monitored by means of robot-guided sensors.

The or one or a plurality of the sensors can (each) have one or a plurality of cameras and/or an image processor. The (desired or actual arrangement of the) optical signals can have, in particular can be, in particular one or a plurality of, in one embodiment, two- or three-dimensional (desired or actual) images or, in one embodiment, two- or three-dimensional (desired or actual) images of the corresponding signal sources.

As a result, unexpected obstacles in one embodiment can be recognized particularly advantageously, in particular (more) reliably and/or (more) simply based on the images of the signal sources concealed by these obstacles in such images or signals of the desired arrangement that are not present in the actual arrangement of the captured optical signals.

Monitoring can be implemented very sensitively and/or with a few (or with fewer) signal sources using a minimum number of (only) one signal of the desired arrangement that is not present in the actual arrangement of the captured optical signals; monitoring can be implemented less susceptible to interference, in particular when there is a plurality of signal sources or if the signal sources are positioned closer to one another, using a minimum number of two or more signals of the desired arrangement that are not present in the actual arrangement of the captured optical signals.

Thus, in one embodiment, one or a plurality of captured actual images of the signal sources is compared with one or a plurality of predicted desired images of these signal sources, and a monitoring reaction is triggered if the minimum number of signal source images present or provided in the desired images is missing in the actual image(s).

In one embodiment, the desired arrangement, in particular the (desired) image or images, is or will be determined, in particular predicted, (relative) to one another on the basis of or as a function of a determined position of the signal sources and of the sensor or sensors.

In one refinement, the desired arrangement, in particular the desired image or images, is or will be determined (relative) to the robot arrangement on the basis of or as a function of a determined position of the robot arrangement, in particular its robots, and/or a predefined or determined position of the signal sources and of the sensor.

In one embodiment, the position of the robot arrangement can be determined on the basis, in one embodiment by means of joint sensors, of measured joint positions of the robot arrangement.

From this, the position of signal sources and/or sensors positioned on the robot arrangement can be determined, in particular by appropriate forward transformation or forward kinematics or based on a kinematic model of the robot arrangement, in one embodiment based on a known position of these signal sources or sensors positioned near, in particular on, the robot arrangement, wherein this position is or will be predefined in one embodiment, in particular in that the signal sources or sensors are or will be positioned in a targeted manner near, in particular on, the robot arrangement, in particular its robot(s).

Additionally or alternatively, a position of signal sources positioned on the robot arrangement or spaced apart from it or signal sources on the vicinity side and/or a position of the or one or a plurality of the sensors positioned on the robot arrangement or spaced apart from it or sensors on the vicinity side (relative) to the robot arrangement can be or become determined, in one embodiment by means of triangulation, in particular with the aid of the captured optical signals, or the like.

Additionally or alternatively, in one embodiment, the desired arrangement of the optical signals, in particular the desired image(s) of the signal sources, is determined on the basis of a kinematic and/or optical model which, in one embodiment, shows or determines a relationship between positions of the robot arrangement and positions of the signal sources and/or sensor(s), in particular to one another, and/or between positions of the signal sources and/or sensor(s), in particular to one another, and desired arrangements, in particular desired images.

In one embodiment, the model can have or take into account optical paths between the signal sources and the sensor(s) and/or a vicinity, in particular provided or known obstacles, of the robot arrangement. Additionally or alternatively, in one embodiment, the model can be or become determined, in particular parameterized, theoretically and/or empirically, in particular with the aid of learning runs of the robot arrangement.

If, for example, the position of signal sources positioned on a robot relative to the robot and its position are known and a camera on the vicinity side captures optical signals from these signal sources, the position of this camera relative to the robot can also be determined from this by means of triangulation. This also applies vice versa for a robot-guided camera and signal sources on the vicinity side. The image of the signal sources can then be predicted for other positions of the robot, which image the camera would have to capture if the optical paths are not disturbed by unexpected obstacles, and this image can be compared with the image that was actually captured.

In this way, the desired arrangement of the optical signals can be (more) advantageously determined in one embodiment, in particular in combination of at least two of the aforementioned features, in particular (more) precisely and/or dynamically or up-to-date.

In one embodiment, one or a plurality of the signal sources are or will be attached to a sheath, in one refinement in a non-destructively releasable manner, in particular positively and/or frictionally, or in a not non-destructively releasable manner, in particular cohesively, which sheath in turn, in a further development, is or will be attached in a non-destructively releasable manner, in particular positively and/or frictionally, or in a not non-destructively releasable manner, in particular cohesively, on the robot arrangement, in particular its robot(s).

As a result, the signal sources in one embodiment can be advantageously, in particular simply and/or precisely positioned on the robot arrangement and/or alternatively used for different robots or robot arrangements, in one embodiment, so to speak, in a kind of "safety vests."

In one embodiment, the actual arrangement is determined, in particular, on the basis of a capturing operation using emitted optical signals by the sensor or sensors, in particular of at least one image that is captured in the case of emitting signal sources, and a capturing operation that is immediately preceding or following in one embodiment, in particular of the same scenery, without emitted optical signals by the sensor or sensors, in particular of at least one image that is captured in the case of non-emitting signal sources. The captured optical signals can then be isolated by subtraction and thus be compared particularly well with the corresponding desired arrangement. In other words, in one embodiment, the actual arrangement can be determined on the basis of a difference image between a captured image with emitted optical signals and a captured image without emitted optical signals, in particular have such an image, in particular be such an image.

Additionally or alternatively, the optical signals of one or a plurality of the signal sources have in one embodiment (in each case) a predefined time pattern that is signal source-specific in one embodiment. As a result, interference from the vicinity can be reduced in one embodiment.

Additionally or alternatively, in one embodiment, two or more of the signal sources emit different, in particular robot (link) specific, optical signals. In one refinement, two or more of the signal sources have different geometries, brightnesses and/or colors for this purpose. In particular, in one refinement, these signal sources can have different optical codes, in particular QR codes. Additionally or alternatively, in one refinement, these different optical signals have predefined time patterns that are different from one another, in particular emission times; in one embodiment, two or more of the signal sources emit their optical signals in a predefined sequence.

As a result, errors and/or interference from the vicinity can be (further) reduced in one embodiment. For example, the probability can be reduced that an optical signal other than the signal corresponding to the desired arrangement is captured instead of an optical signal from a signal source that emits a specific optical signal but is concealed by an unexpected obstacle.

In one embodiment, the monitoring reaction, in particular its type and/or its triggering, depends on a number and/or a location of non-existent signals of the desired arrangement in the actual arrangement.

In particular, in the absence of at most a first number of signals, in particular only one signal, and/or the absence of signals only in a predefined (first) range, no or (only) a first, in particular weaker or smaller, monitoring reaction can be triggered, in particular (only) a warning is issued and/or a velocity of the robot arrangement is (more easily) reduced, and (only) in the absence of at least a larger second number of signals, in particular at least two signals, and/or the absence of signals in a predefined other range, which can be larger than the first range and/or can be at a distance from it, a (second, in particular stronger or larger) monitoring reaction is triggered, in particular a velocity is reduced more, in particular the robot arrangement is stopped.

Additionally or alternatively, in one embodiment, the monitoring reaction depends on a thermal radiation detection by the or one or a plurality of the sensor(s). In this way, in one embodiment, a distinction can advantageously be made between light sources and people.

In one embodiment, the or a (type of) monitoring reaction can comprise, in particular can be, an (output of), in particular optical, acoustic and/or haptic, warning, a change in a predefined movement of the robot arrangement, in particular in a deviation movement and/or a velocity reduction, in particular a stop.

In one embodiment, a robot-guided component interrupts, in particular according to plan, an optical path between at least one signal source, in particular on the robot side, and the or at least one of the sensor(s).

In this way, it can advantageously be captured whether the robot arrangement is guiding a component according to plan, in particular has gripped it, or whether it is not guiding a component according to plan, in particular a gripper is empty. Additionally or alternatively, a robot-guided component can be illuminated or a missing component or an empty gripper can be signaled by a corresponding light spot in the vicinity.

According to one embodiment of the present invention, a system, in particular in terms of hardware and/or software, in particular in terms of programming, is set up to carry out a method described herein and/or comprises:
  one or a plurality of sensors which are set up or used for capturing optical signals from a plurality of signal sources, wherein the signal sources and/or the one or a plurality of the sensor(s) is/are positioned on the robot arrangement; and
  means for triggering a monitoring reaction if a deviation of an actual arrangement of the captured optical signals from a desired arrangement of these signals exceeds a limit value, in particular if at least a predefined minimum number of signals from the desired arrangement is not present in the captured optical signals.

In one embodiment, the system or its means comprises: means for determining the desired arrangement on the basis of a determined position of the signal sources and the sensor to one another, in particular on the basis of a determined position of the robot arrangement and/or a predefined or determined position of the signal sources and the sensor in relation to the robot arrangement, and/or on the basis of a kinematic and/or optical model.

A means within the meaning of the present invention may be designed in hardware and/or in software, and in particular may comprise a data-connected or signal-connected, in particular, digital, processing unit, in particular microprocessor unit (CPU), graphic card (GPU) having a memory and/or bus system or the like and/or one or a plurality of programs or program modules. The processing unit may be designed to process commands that are implemented as a program stored in a storage system, to capture input signals from a data bus and/or to output output signals to a data bus. A storage system may comprise one or a plurality of, in particular different, storage media, in particular optical, magnetic, solid-state and/or other non-volatile media. The program may be designed in such a way that it embodies or is capable of carrying out the methods described herein, so that the processing unit is able to carry out the steps of such methods and thus, in particular, is able to monitor the robot arrangement. In one embodiment, a computer program product may comprise, in particular, a non-volatile storage medium for storing a program or comprise a program stored thereon, an execution of this program prompting a system or a controller, in particular a computer, to carry out the method described herein or one or a plurality of steps thereof.

In one embodiment, one or a plurality of steps, in particular all steps of the method, are carried out completely or partially automatically, in particular by the system or its means.

In one embodiment, the system has the robot arrangement and/or signal sources.

The desired and/or actual arrangement or image(s) can be two or three-dimensional in one embodiment, and the sensor or sensors accordingly have, in particular, 3D camera(s) (systems). As a result, in one embodiment, in particular in combination with signal sources which are positioned on the robot arrangement and/or are passive or are reflective, in particular which are illuminated in a targeted manner, distance information is obtained or used by means of time-of-flight measurements at predefined times in one embodiment.

As a result, in one embodiment, the reliability of the monitoring can be (further) improved, for example in that reflections on an obstacle that is not provided are not erroneously captured as an optical signal from a signal source positioned on the robot arrangement. Additionally or alternatively, the determination of the position of the sensor or camera system relative to the robot arrangement, in particular by triangulation or the like, can thereby be improved. Additionally or alternatively, in one embodiment, in particular in the case of a mobile or moving sensor, its current position can advantageously be determined in each case.

Correspondingly, in one embodiment, the, in particular current, position of the or one or a plurality of the, in particular mobile, sensors relative to the, in particular mobile, robot arrangement is determined on the basis of a distance measurement, in particular time-of-flight measurement, by means of captured optical signals, and the desired arrangement, in particular the desired image(s), of captured optical signals is then determined on the basis of this determined position of the sensor or sensors in relation to the robot arrangement.

Further advantages and features arise from the dependent claims and from the embodiments.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIG. 1 schematically depicts a system for monitoring a robot arrangement according to an embodiment of the present invention; and FIG. 2 illustrates a method for monitoring the robot arrangement according to an embodiment of the present invention.

DETAILED DESCRIPTION

FIG. 1 depicts a system for monitoring a robot arrangement according to an embodiment of the present invention.

The robot arrangement consists of a multi-jointed or multi-axis robot 10 with a stationary or mobile base 11, a carousel 12 rotatable on it about a vertical axis, and a multi-jointed or multi-axis robot hand rotatable about a horizontal axis with a link arm 13, an arm 14, and an end effector 15.

Light sources in the form of laser pointers and/or LEDs 20, which have link-specific colors and/or shapes and/or can be activated in specific time patterns, are positioned on links of the robot 10.

A plurality of sensors in the form of cameras 30 are distributed around the working space of the robot 10, only a few of which sensors are shown in FIG. 1.

These capture optical signals from the light sources 20 (FIG. 2: step S10), with a deflection mirror 200 being indicated by way of example in FIG. 1 in order to (better) capture optical signals with the camera 30.

The cameras 30 are signal-connected to a monitoring device 100, which monitoring device can be integrated in a controller of the robot 10 and, for example, thereby receives a position of the robot 10 or corresponding joint angles.

From this, in a step S20 (cf. FIG. 2), the monitoring device 100 determines the current position of the light sources 20 positioned on the robot with the aid of a kinematic model, the position of which is known in relation to or on the robot, for example, by measuring and/or specifically placing the light sources accordingly.

The positions of the individual cameras 30 are also known in the monitoring device 100. These can, for example, have been determined in advance by means of triangulation from known positions of the light sources.

With the help of an optical model, the monitoring device 100 now predicts desired images of the light sources 20 as they (should) be captured by the cameras 30, provided that no unexpected obstacles between the robot 10 and the cameras 30 unexpectedly interrupt the optical path from the light sources to the cameras. Known or permitted obstacles can be taken into account in the optical model, for example with the help of appropriate learning drives or a desired configuration of the vicinity.

In a step S30, the monitoring device compares these desired images with the actual images actually captured by the cameras 30-32. In one embodiment, images with and without active light sources can be subtracted from one another, so that the desired and actual images each have only the images of the light sources themselves that are isolated in this way.

If at least a predefined minimum number of desired images of the light sources is not present in one of the actual images (S40: "Y"), the monitoring device 100 triggers a monitoring reaction (S50), for example, reduces the velocity of the robot 10; if necessary, it stops the robot. Otherwise (S40: "N"), the monitoring device or the method returns to step S10.

For the sake of clarity, FIG. 1 shows a person H who unexpectedly stepped into the working space of the robot 10.

It can be seen that this interrupts an optical path between the camera 32 and the light source 20 horizontally opposite thereto in FIG. 2, so that the image of this light source is not present in the corresponding target image of the camera 32 in the actual image captured by the latter.

It can be seen that a failure of this light source 20 or of this camera 32 as well as the obstacle H lead to a deviation between the desired and actual image and trigger the (same) monitoring reaction, so that neither the light source nor the cameras have to be designed expensively in safe technology.

In addition, the embodiment makes it clear that a component guided on the end effector 15 would interrupt the optical path between the camera 30 and the lower signal source 20 in FIG. 1, which would instead illuminate (only) the component. Conversely, a light spot from this signal source 20 therefore signals a component-free end effector.

In addition, the embodiment makes it clear that, for example, it is possible to determine based on the actual image from camera 32, whether there is an obstacle—as in FIG. 1—in the region of the robot hand, the carousel, or the base, so that the monitoring reaction can advantageously be coordinated therewith.

The embodiment also makes it clear that the desired image or the desired arrangement is predicted on the basis of a kinematic and optical model that comprises known obstacles in the vicinity of the robot. If, for example, the person H is at the position shown in FIG. 1 according to plan, the corresponding model predicts a desired image from camera 32 in which the light source 20 opposite thereto is not present according to plan, so that in this case no monitoring reaction is triggered.

Although embodiments have been explained in the preceding description, it is noted that a large number of modifications is possible.

Thus, in addition or as an alternative to LEDs or laser pointers, the signal sources 20 can also have passive signal sources, in particular reflectors, which in one embodiment are specifically illuminated.

It is also noted that the embodiments are merely examples that are not intended to restrict the scope of protection, the applications and the structure in any way. Rather, the preceding description provides a person skilled in the art with guidelines for implementing at least one embodiment, with various changes, in particular with regard to the function and arrangement of the described components, being able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE SIGNS

10 Robot
11 Base
12 Carousel
13 Link arm
14 Arm
15 End effector
20 Light source (laser pointer; LED)
30-32 Camera
100 Monitoring device
200 Deflection mirror
H Person

What is claimed is:

1. A method for monitoring a robot arrangement that includes at least one robot and a robot controller, the method comprising:
    capturing optical signals from a plurality of signal sources with at least one sensor, wherein at least one of the plurality of signal sources or the at least one sensor is positioned on the robot arrangement;
    determining with the robot controller a deviation of an actual spatial arrangement of the captured optical signals from a desired spatial arrangement of the signals; and
    triggering by the robot controller a monitoring reaction of the at least one robot in response to the determined deviation exceeding a predetermined limit value;
    wherein the monitoring reaction is at least one of:
    producing at least one of an optical output, an acoustic output, or a haptic output, or
    causing a change in a predefined movement of the robot arrangement;
    wherein the desired spatial arrangement is determined on the basis of a determined position of the plurality of signal sources and the sensor to one another;
    wherein the determined position of the plurality of signal sources and the sensor to one another is based on at least one of a kinematic model or an optical model; and
    wherein determining the deviation comprises determining whether at least a predefined minimum number of signals from the desired arrangement are not present in the actual arrangement of the captured optical signals; and
    the actual arrangement is determined by the at least one sensor based on comparing at least a first signal captured with emitted optical signals to at least a second signal captured without emitted optical signals.

2. The method of claim 1, wherein the determined position of the plurality of signal sources and the sensor to one another is based on at least one of:
    a determined position of the robot arrangement; or
    a predefined or determined position of the plurality of signal sources and the sensor relative to the robot arrangement.

3. The method of claim 1, wherein at least one of:
    at least one of the plurality of signal sources is attached to a sheath attached to the robot arrangement; or
    at least one of the plurality of signal sources emits the optical signals.

4. The method of claim 3, wherein the emitted optical signals comprise at least one of:
    at least one of laser light or visible light;
    infrared light; or
    UV light.

5. The method of claim 1, wherein at least one of:
    at least one of the plurality of signal sources is illuminated by at least one light source with light, and the light is reflected as an optical signal; or
    at least one deflection means is arranged in an optical path between at least one of the plurality of signal sources and the sensor.

6. The method of claim 1, wherein:
the optical signals of at least one of the plurality of signal sources is activated according to a predefined time pattern that is different from at least one other of the plurality of signal sources.

7. The method of claim 1, wherein at least two of the plurality of signal sources emit different optical signals.

8. The method of claim 7, wherein at least one of:
the at least two of the plurality of signal sources emit different robot link-specific optical signals;
the different optical signals have at least one of different geometries, different brightnesses, or different colors; or
the different optical signals have mutually different predefined time patterns.

9. The method of claim 1, wherein the monitoring reaction depends on at least one of:
at least one of a number or a location of non-existent signals of the desired arrangement in the actual arrangement; or
a thermal radiation detected by the sensor.

10. The method of claim 1, further comprising:
interrupting an optical path between at least one of the plurality of signal sources and the sensor with a robot-guided component.

11. The method of claim 10, wherein interrupting the optical path comprises interrupting the optical path on the robot side.

12. A system for monitoring a robot arrangement that includes at least one robot, the system comprising:
at least one sensor designed to capture optical signals from a plurality of signal sources, wherein at least one of the plurality of the signal sources or the at least one sensor is positioned on the robot arrangement; and
means for triggering a monitoring reaction in response to the determination that the deviation of an actual spatial arrangement of the captured optical signals from a desired spatial arrangement of the signals exceeds a predetermined limit value;
wherein the monitoring reaction is at least one of:
producing at least one of an optical output, an acoustic output, or a haptic output, or
causing a change in a predefined movement of the robot arrangement;
wherein the desired spatial arrangement is determined on the basis of a determined position of the plurality of signal sources and the sensor to one another;
wherein the determined position of the plurality of signal sources and the sensor to one another is based on at least one of a kinematic model or an optical model; and
wherein determining the deviation comprises determining whether at least a predefined number of signals from the desired arrangement are not present in the actual arrangement of the captured optical signals; and
wherein the actual arrangement is determined by the at least one sensor based on comparing at least a first signal captured with emitted optical signals to at least a second signal captured without emitted optical signals.

13. A computer program product for monitoring a robot arrangement that includes at least one robot, the computer program product including a program code stored on a non-transient, computer-readable medium, the program code, when executed by a computer, causing the computer to:
capture optical signals from a plurality of signal sources with at least one sensor, wherein at least one of the plurality of signal sources or the at least one sensor is positioned on the robot arrangement;
determine a deviation of an actual spatial arrangement of the captured optical signals from a desired spatial arrangement of the signals; and
triggering a monitoring reaction in response to the determined deviation exceeding a predetermined limit value;
wherein the monitoring reaction is at least one of:
producing at least one of an optical output, an acoustic output, or a haptic output, or
causing a change in a predefined movement of the robot arrangement;
wherein the desired spatial arrangement is determined on the basis of a determined position of the plurality of signal sources and the sensor to one another;
wherein the determined position of the signal sources and the sensor to one another is based on at least one of a kinematic or an optical model; and
wherein determining the deviation comprises determining whether at least a predefined minimum number of signals from the desired arrangement are not present in the actual arrangement of the captured optical signals; and
wherein the actual arrangement is determined by the at least one sensor based on comparing at least a first signal captured with emitted optical signals to at least a second signal captured without emitted optical signals.

* * * * *